United States Patent [19]
Burton

[11] 3,789,385
[45] Jan. 29, 1974

[54] ERROR INDICATING DISPLAY

[75] Inventor: Christopher Philip Burton, Alderley Edge, England

[73] Assignee: International Computers Limited, London, England

[22] Filed: June 7, 1972

[21] Appl. No.: 260,423

[30] Foreign Application Priority Data
June 10, 1971 Great Britain.................. 27,364/71

[52] U.S. Cl. ............................ 340/324 R, 340/177
[51] Int. Cl. ............................................. G09f 9/42
[58] Field of Search.340/324 R, 177, 225, 380, 408, 340/316, 317

[56] References Cited
UNITED STATES PATENTS
3,387,084   6/1968   Hine et al. ......................... 340/225
3,187,321   6/1965   Kameny .......................... 340/365 R
3,600,592   8/1971   Mahan et al. .................... 340/365 P Primary Examiner—John W. Caldwell
Assistant Examiner—Marshall M. Curtis
Attorney, Agent, or Firm—Hane, Baxley & Spiecens

[57] ABSTRACT

In a display system for indicating error conditions in groups of registers. The names of a group of registers are carried on an exchangeable slide from which they are projected on to a screen. An array of lamps is positioned behind the screen, one lamp being associated with each register name. A code area on each slide is sensed to identify the particular group of registers corresponding to the names on the slide and to control the connection of each one to its associated lamp thus to provide a visual indication of the state of each register in the group.

3 Claims, 3 Drawing Figures

ERROR INDICATING DISPLAY

BACKGROUND OF THE INVENTION

The present invention relates to display systems.

In systems having a large number of working elements, it is generally helpful to be able to determine whether an element is operating or not. Such large systems may be either electrical, electro-mechanical or mechanical in nature. In a data processing system, for example, it is useful to be able to check a large number of electrical or electro-mechanical elements for faults. A common problem in checking large systems is the ready location of particular elements in a relatively short period of time. Equally it is important that an element which produces an indication is in fact, that element which is thought to be tested. Thus, to be effective, any checking system must be highly reliable as well as being capable of rapid checking operations. For example, in the central processing unit of a data processing system, it is sometimes required to check the operation of a number of registers. By visually displaying the results of such a check, it becomes relatively simple to locate any faults. It is known to provide indicating panels containing lamps, which are lit to indicate elements requiring attention. In a large data process system there may be a large number of elements to be maintained and a correspondently large number of indicating lamps will therefore be required. An array of such a capacity is both complex, expensive and difficult to view. However, if a small display panel is provided to house the indication lamps and means is provided for switching the lamps between groups of monitorable elements it is essential that the association of the lamps with the various groups shall be readily ascertained. Moreover, there is a danger that under these conditions an indication may either be wrongly interpreted as appropriate to a different group or that an error in the group selection may result in a display of erroneous information.

SUMMARY OF THE INVENTION

According to the present invention, a display system includes means to project images of an exchangeable set onto a display member; a fixed array of indicating devices associated respectively with images on the display member; means responsive to the projection of images to produce selection signals; and means responsive to said selection signals for connecting a monitorable element, corresponding to a displayed image, to one of said indicating devices such that the state of the element corresponding to the displayed image is indicated on said display member.

BRIEF DESCRIPTION OF THE DRAWING

A display system embodying the present invention will now be described, by way of example, with reference to the accompanying drawing, in which.

DESCRIPTION OF THE PREFERRED EMBODIMENT

As noted above, in large systems such as the central processing unit (CPU) of a computer, it is sometimes necessary to inspect and indicate the condition of a large number of elements, for example, to indicate one or more elements in need to attention. Such elements will be referred to as registers although a 'register' may be any particular block of logic circuitry or even a particular element such as a certain transistor. Since there are a large number of registers it is desirable to display a name or representation of each register such that a visual identification of each register can be provided. It then becomes necessary to select by means of a code or address, the particular register to be indicated. It is preferable, in view of considerations of size, space and cost to employ a single display device indicating the condition of a plurality of such registers.

Figure 1:
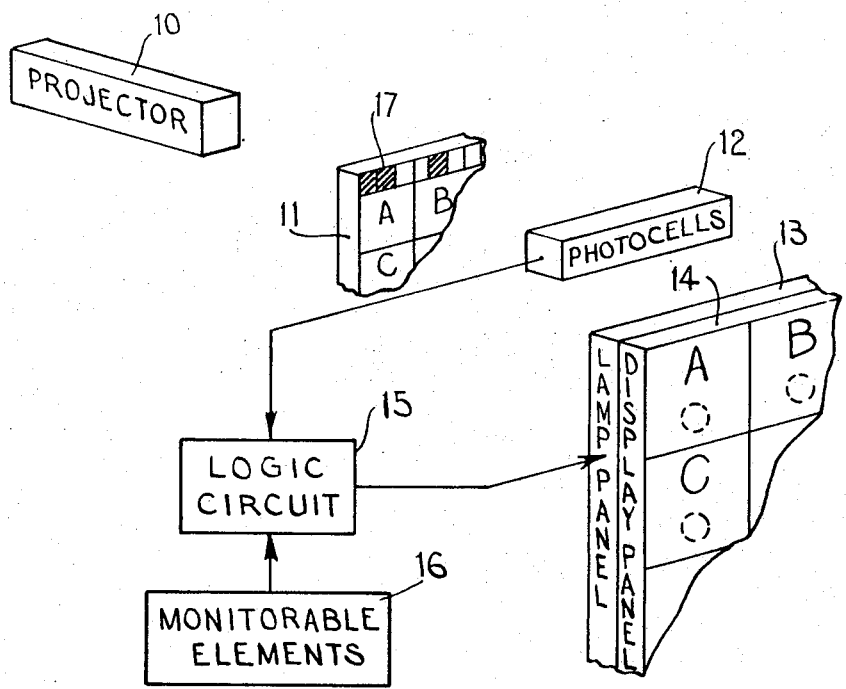
FIG. 1 shows a projection and display system.
Figure 2:
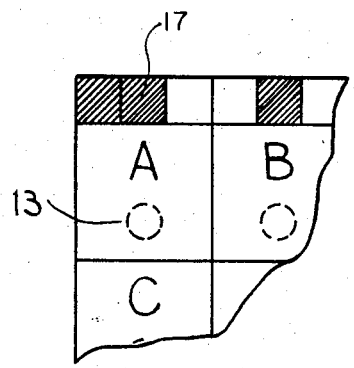
FIG. 2 is an example of a slide segment having both an image and a code portion.

With these considerations in mind, attention is directed to FIGS. 1 and 2 of the drawing. A projector 10 is positioned behind a film or slide 11 so that the slide may be projected onto display panel 14. The slide 11 has representations or names of registers thereon arranged in the form of a matrix. For example, slide 11 may have the letters 'A' 'B' 'C' etc., which are the names of paticular registers in a CPU (not shown). A portion 17 of slide 11 is reserved for a code, the purpose of which will be subsequently explained. A bank of photocells 12 is positioned so as to detect only the code appearing in portion 17 of slide 11.

The output of photocells 12 is applied as one input to logic circuit 15 while output signals from a series of monitorable elements 16 are applied as a second input thereto. Each of the monitorable elements 16 is in fact one of a group 32–34, of bistable devices associated with the registers to be inspected. Each of these bistable devices is arranged to be set or reset respectively in accordance with the state of its associated register. The output of logic circuit 15 is applied to a lamp array 13 which is positioned between slide 11 and the display panel 14. Thus, the name of registers 'A' 'B' 'C' etc. may be displayed on panel 14, the displayed names being respectively positioned each adjacent to one of the lamps in the array 13 so that the projection of the names provides, for each lamp in the array 13, a legend to indicate the particular register with which the lamp is associated. The photocells 12 are preferably so positioned that they do not form part of the displayed image.

The lamp array 13 may comprise a matrix of light emitting diodes embedded in a substantially transparent member such that the lamp array 13 will not interfere with the projection of images from slide 11. One face of the display panel is frosted or the display panel is translucent to allow images of the names projected from the slide 11 to be visually displayed.

In operation projector 10 projects a set of images from a selected slide 11. As shown in FIG. 2 each slide has a code portion 17. The code may be in the form of opaque and blank areas on part of the slide 11 and is effective to provide an address of a particular group of registers. The address of the particular group of registers is applied to logic circuit 15 by means of the photocell array 12 which allows the monitorable elements 16 corresponding to registers represented by the images on display panel 14 to be connected to lamps in array 13. In other words the significance of the output of photocells 12 is to select one group of monitorable elements 16 from a plurality of such groups for connection to lamps in array 13. Thus, monitorable elements 16 associated with registers 'A' 'B' 'C' etc. are connected to lamps in lamp array 13. If, for example, the lamp associated with the name of register 'A' is illuminated, an indication that register 'A' needs attention is provided. Similarly, a convention may be chosen such that a particular register will need attention only if the lamp associated with the name of that register is not illuminated.

Figure 3:
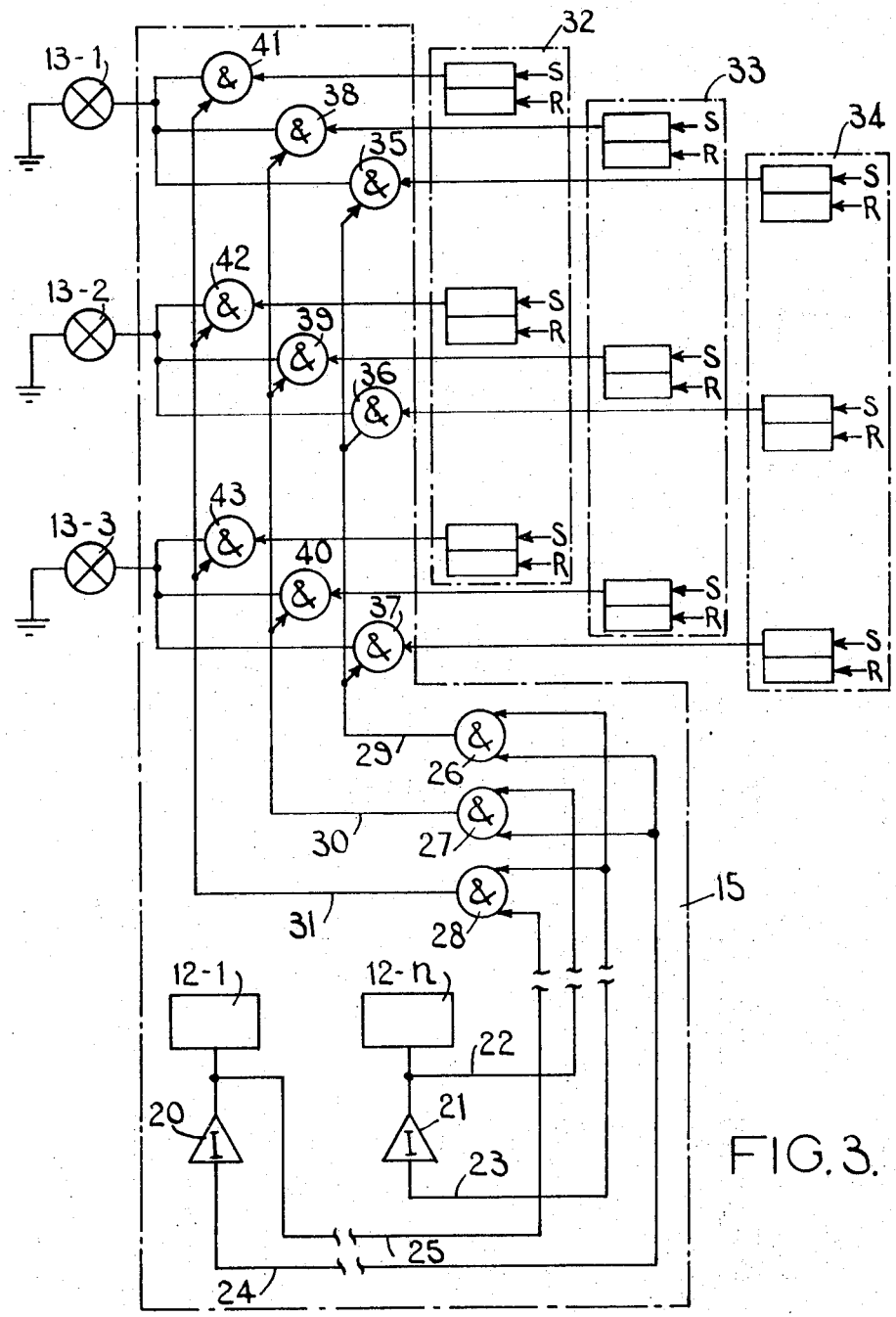
FIG. 3 is a logic circuit for connecting a monitorable element to an indicating device, such as a lamp.

Referring to FIG. 3, there is shown a logic circuit 15 which operates to interpret the output of photocells 12–1 to 12–n to connect a particular group 32, 33 or 34 of monitorable elements 16 to lamps 12–1, 12–2 and 13–3. The outputs of photocells 12–1 to 12–n are respectively applied over lines 25 and 22 to AND gates 28 and 27. The output of photocell 12–1 is also inverted by inverter 20 and is passed over line 24 to AND gates 26 and 27. Also, the output of photocell 12–n is inverted and applied over line 23 to AND gates 26 and 28. The output of AND gate 26 is applied over line 29 to further AND gates 35, 36, 37. Similarly, the output of AND gate 27 is applied over line 30 to AND gates 38, 39, 40 and the output of AND gate 28 is applied over line 31 to AND gates 41, 42, 43. AND gates 35 to 43 are each effective to connect one of the monitorable elements from each of the groups 32 to 34 to an associated lamp 13–1 to 13–3. As previously mentioned the monitorable elements are bistable devices each having set (S) and reset (R) inputs.

In operation, photocells 12–1 to 12–n will produce output signals in accordance with the address code of a particular slide 11. If, for example, opaque areas are detected by both photocells 12–1 and 12–n low signals on lines 22 and 25 will prevent AND gates 27 and 28 from enabling groups of AND gates 38, 39, 40 and 41, 42, 43 respectively. However, inverters 20 and 21 will produce high signals over lines 23 and 24 which will open AND gate 26 thus enabling the group of AND gates 35, 36, 37 so that if the S line of one of the bistable devices in group 34 is raised due to its associated lamp needing attention the lamp associated with that register will be illuminated behind display panel 14. However, if, for example, an opaque code area is detected by photocell 12–1 and a blank area is detected by photocell 12–n, high signals will be applied to AND gate 27 by inverter 20 over line 24 and by photocell 12–2 over line 22 to open AND gate 27 and thus enabling the group of AND gates 38, 39, 40. Similarly, AND gates 26 and 28 are positively prevented from enabling respective groups of AND gates 35, 36, 37 and 41, 42, 43. Thus AND gate 26 controls the opening of the gates 35 to 37 to permit the devices in group in 34 to be connected to the lamps in the panel 13. Equally AND gate 27, in controlling gates 38–40 effectively connects the elements of group 33 to the lamps of panel 13 and AND gate 28 controls the connection of elements of group 32 to the lamps. Thus, the coded area 17 of a slide 11 is sensed and decoded to control the connection of the correct group of bistable devices to lamps in the panel 13 to allow an operator to determine which register of the group of registers whose names are displayed, is in need of attention. If the slide 11 is changed, then the decoding of the new code area 17 will select a new group of bistable devices to indicate the states of the new group of registers named on the new slide 11.

It will be appreciated that while the code portions 17 on slide 11 are positioned at the top of the slide, it may be more convenient to position such code portions 17 elsewhere on the slide 11. In this event, of course, photocells 12 would have to be aligned with code portions 17.

While the images displayed have been described as presenting the names of registers in a CPU, the images could represent different transistors or integrated circuits, say in an electrical circuit, electro-mechanical relays or even pneumatic or hydraulic values. Lamp array 13 may be an array of small conventional electric lamps or preferably may be a matrix of light emitting diodes embedded in a suitable transparent material such as epoxy resin of Perspex (Reg.T.M.).

In summary, the present invention provides a display system in which the names and conditions of a large number of elements in a system are reliably and easily displayed visually by dividing the elements into convenient groups, each group being associated with an individual slide which provides a unique indication of the name of the element in its own group. The slide 11 is easily removable and may be replaced by other slides having legends corresponding to other groups, the code portion selecting a single group appropriate to the group of names projected by the slide. Also, by providing both the images and associated code on a single slide, there is a greater degree of certainty that the names (of the elements) which are displayed are in fact those elements whose conditions are being indicated.

In practice, lamp array 13 may be comprised of 576 lamps arranged in the form of a matrix of 16 rows each having 36 lamps therein. Each slide 11 may also have a set of 576 images arranged in corresponding rows and columns thereon while a plurality of such slides 11 will be provided. Each of the registers or other monitorable elements will have an indicating device, such as the bistable devices described, and the decoding logic circuit 15 provides a logic gating arrangement effective to select the appropriate group of indicators to be connected to the lamp array 13.

Finally, while photocells 12 have been described as a means of producing signals selecting monitorable elements 16, other types of electrical or mechanical sensing devices could be employed. or example, coded portions 17 of slide 11 could be comprised of areas of magnetic and non-magnetic materials with particular selecting signals being produced by a magnetic transducing device, or alternatively the slides might have lugs or projections positioned to co-operate with switches in accordance with information similar to that represented by the coded portions 17 of slide 11.

I claim:

1. An error indicating display system including a projector; a projection slide bearing a set of images consisting of identification information; a projection screen, the projector being arranged to project the images of the set from the slide on to the screen; a fixed array of indicating lamps each arranged to illuminate a predetermined area of the screen, each illuminable area being associated respectively with a different one of the projected images; a plurality of monitorable elements; code information on the slide; and means for decoding the code information to select a group of said monitorable elements, each separate element of the group corresponding to different ones of the images of the set, and to connect each element to that lamp associated with the corresponding image whereby the condition of illumination of an area by its associated lamp indicates the state of that monitorable element connected to the associated image.

2. A display system as claimed in claim 1 in which the code information includes opaque and transparent areas in a predetermined location on the slide and further includes means for sensing the predetermined location.

3. A display system as claimed in claim 2 in which the means for sensing said predetermined location includes photo-electric cells.

* * * * *